United States Patent [19]

Tomikawa

[11] Patent Number: 4,516,122

[45] Date of Patent: May 7, 1985

[54] COMMUNICATION SYSTEM WITH COLLISION DETECTION AND FORCED COLLISION

[75] Inventor: Masataka Tomikawa, Tokorozawa, Japan

[73] Assignee: Tokyo Shibaura Denki Kabushiki Kaisha, Kawasaki, Japan

[21] Appl. No.: 413,897

[22] Filed: Sep. 1, 1982

[30] Foreign Application Priority Data

Sep. 9, 1981 [JP] Japan ................ 56-141062

[51] Int. Cl.³ .......................... H04Q 9/00; H04J 3/00
[52] U.S. Cl. .......................... 340/825.5; 340/825.52; 370/85
[58] Field of Search ................ 340/825.5, 825.52; 178/2; 370/85, 94

[56] References Cited

U.S. PATENT DOCUMENTS 4,281,380 7/1981 DeMesa, III et al. ............ 340/825.5
4,337,465 6/1982 Spracklen et al. ............... 340/825.5
4,395,710 7/1983 Einolf, Jr. et al. ............... 340/825.5

Primary Examiner—Donald J. Yusko
Attorney, Agent, or Firm—Cushman, Darby and Cushman

[57] ABSTRACT

In a communication system for a local network, in which a plurality of host computers are connected to a coaxial cable through respective controllers and transceivers, each controller, as soon as it has received a text frame, transmits an acknowledgement frame to the transmitting side controller. The transmitting side controller transmits a first dummy frame after the completion of the text frame transmission until a collision on the line is detected. The receiving side controller transmits a second dummy frame from the instant of completion of the text frame reception to positively cause a collison. When the collision is no longer detected, the receiving side controller stops the transmission of the second dummy frame and transmits an acknowledgement frame immediately afterwards.

11 Claims, 7 Drawing Figures

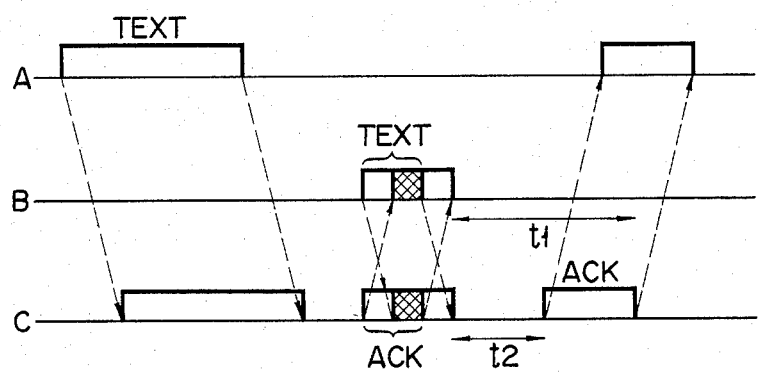
F I G. 3
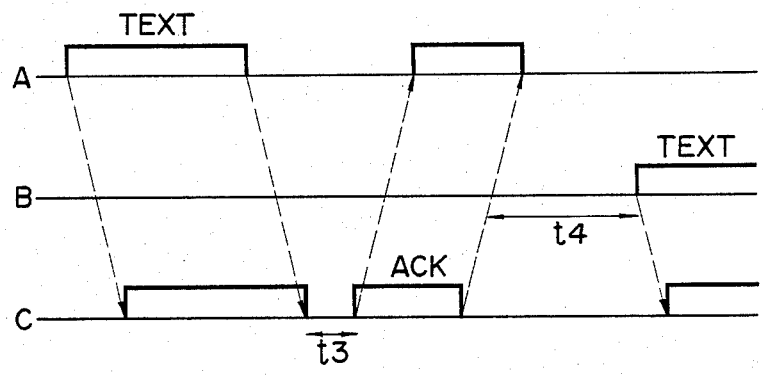
F I G. 4
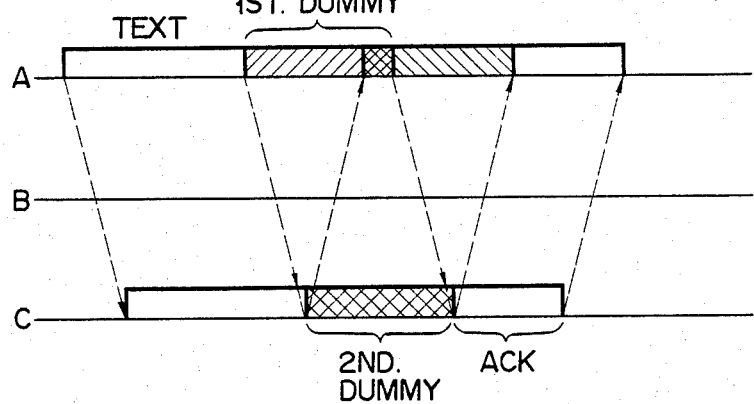
F I G. 5

COMMUNICATION SYSTEM WITH COLLISION DETECTION AND FORCED COLLISION

BACKGROUND OF THE INVENTION

The invention relates to a communication system and, more particularly, to a communication system used for a local network.

Recently, local networks which have interconnected computer units distributed in relatively small areas are extensively used. An Ethernet system proposed by Xerox Company is a typical example. The system adopts a common bus structure using a linearly extending coaxial cable as the transmission medium. Various local networks have been developed other than the Ethernet system. At present, networks of different systems cannot be interconnected. The International Standardize Organization (ISO) has been working on a standization plan for the interconnection of networks since 1977. This plan is called Open Systems interconnection (OSI). The OSI consists of seven protocol stages called physical level stage, data link stage, network stage, transport stage, session stage, presentation stage and application stage from the lowest stage in the mentioned order. The physical level stage prescribes electrical and mechanical conditions for setting, maintaining and cancelling physical inter-system lines. An example of this protocol stage is X.21, V.24, V.35 prescribed by CCITT. The data link stage provides an inter-system data link, through which the data transfer and error correction are controlled. An example of this stage is HDLC or X.25 (level 2) protocol. In the Ethernet system, only these two protocol stages are prescribed, and the other protocol stages are not. The Ethernet system does not prescribe the flow control and acknowledgment of transfer as a text frame transferred from the upper protocols. It leads to the reduction of effective transfer rate and response time.

The effective transfer rate and response time are also reduced for the following reason. In the local network only a single frame can be transmitted at a time on a bus line which consists of a coaxial cable or the like. The network access from each node i.e., junction of bus and each computer unit is controlled by a carrier sense multiple access/collision detection (CSMA/CD) system. According to this system, each node can start transmission if there is no frame transmitted from the other nodes to the bus, i.e., if the bus is silent. If there is a frame on the bus, the transmission is delayed until the frame vanishes. However, a plurality of nodes can simultaneously start transmission when these nodes detect the silence state of the bus. In such a case, collision of a plurality of frames can occur on the bus. In order to avoid such a collision, in the CSMA/CD system the transmitter node checks the state of the bus after the frame transmission has been completed. If a collision is detected, the subsequent transmission is postponed for a suitable period of time. The waiting period is set for each node by making use of random numbers. Thus, a collision rarely occurs again when the transmission is started after the lapse of the waiting time. With this arrangement of the Ethernet system (hereinafter referred to as original Ethernet system), however, the response time, and hence the effective transfer rate, is further reduced.

An Acknowledging Ethernet system proposed by Keio University in Japan is an improved version of the original Ethernet system. In this system, the acknowledgement of transfer which has been effected in an upper protocol in the original Ethernet system, is done in the data link stage. More particularly, the preparation and transmission of an acknowledgement frame is undertaken not by the host side but by the node side controller, thereby reducing the burden on the host side and reducing the operation speed. Further, higher priorities are given to the transmission of the acknowledgement frame than to the transmission of the general text frame. This is realized by setting the period, which is provided from the instant of detection of the silence state till the start of transmission of the acknowledgement frame, to be shorter than the period till the start of transmission of the text frame. However, in the Acknowledging Ethernet system the bus utility efficiency is decreased because a fixed period always has to be provided from the instant of detection of the silence state till the start of transmission of a text frame.

SUMMARY OF THE INVENTION

An object of the invention is to provide a communication system, in which the transmission of the acknowledgement frame is done without providing any more time than is necessary from the instant of the completion of the text frame reception, thereby improving the effective data transfer rate of a local network.

According to the invention, the above object is attained by a communication system for a local network, which comprises a common bus interconnecting a plurality of computer units and a controller connected between each unit and the common bus for controlling the access to the bus and each including a collision detector for detecting a frame collision on the bus, each of the controllers transmitting, when a request of transmission is supplied to a text frame and a first dummy frame immediately following the text frame, the first dummy frame being transmitted until a collision is detected, the controller which receives the text frame transmits a second dummy frame from the instant of completion of the text frame reception till a later one of the instants when the state of collision is no longer detected and when it is ready to transmit an acknowledgement frame and the acknowledgement frame immediately following the second dummy frame.

BRIEF DESCRIPTION OF THE DRAWINGS

FIGS. 3 to 5 are views showing the manner of frame transmission in the original Ethernet system, Acknowledgement Ethernet system and system of the embodiment to illustrate the effects of the embodiment.

DETAILED DESCRIPTION OF A PREFERRED EMBODIMENT

Figure 1:
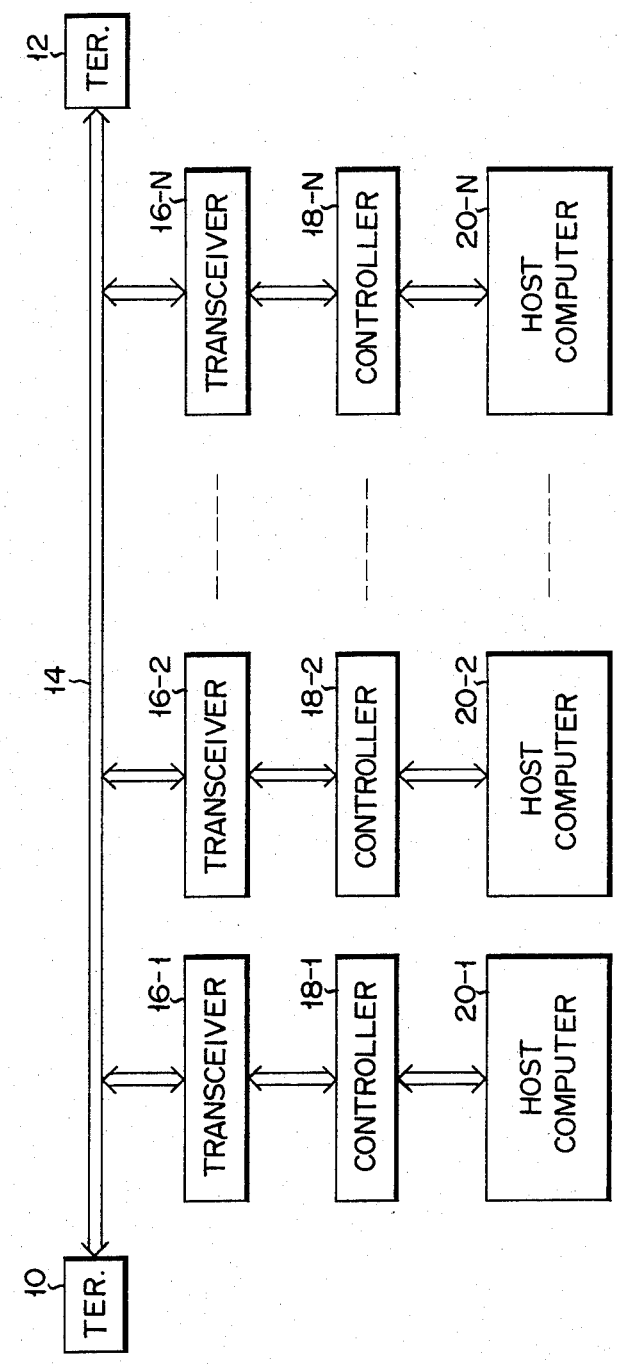
FIG. 1 is a block diagram showing an embodiment of a communication system according to the invention.

An embodiment of the communication system according to the invention will now be described with reference to the accomapnying drawings. FIG. 1 is a block diagram showing a local network using the invention. The access control of this network substantially conforms to that of the original Ethernet system. Controllers 18-1, 18-2, . . . , 18-N are connected through respective transceivers 16-1, 16-2, . . . , 16-N to a bus line 14 which are terminated at the opposite ends in respective terminators 10 and 12 with a rating of 1 W or above. The bus line 14 consists of a coaxial cable with a characteristic impedance of 50Ω. The transceivers 16-1, 16-2, ..., 16-N have a main role of converting a voltage level on cable 14 into a logic level and vice versa. The connection of each transceiver is made by peeling off a relevant portion of the cover of the coaxial cable 14 and urging a needle projecting from the transceiver 16 to the exposed cable portion. Thus, a transceiver 16 can be readily removed, or a new transceiver can be readily added, while the network is operating and also without cutting the cable. The controllers 18-1, 18-2, ..., 18-N control the access to the bus line 14 by, for example, collision detection and the transmission of an ackowledgement frame. Host computers 20-1, 20-2, ..., 20-N are connected to the respective controllers 18-1, 18-2, ..., 18-N.

Figure 2:
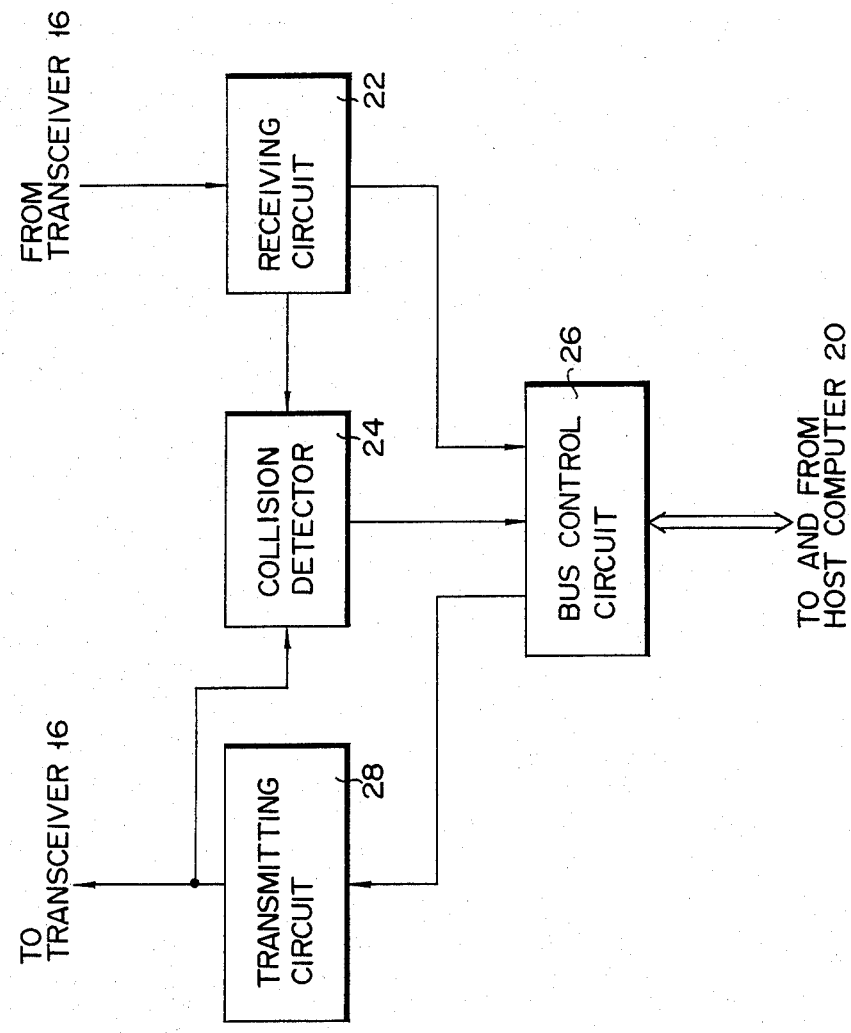
FIG. 2 is a block diagram showing a controller in the same system in detail.

Each of controllers 18-1, 18-2, ..., 18-N have the same construction, which is shown in detail in FIG. 2. The signal from the transceiver 16 is supplied to a receiving circuit 22. The receiving circuit 22 supplies the received signal to a collision detector 24. The receiving circuit 22 also executes the detection of the silence state and supplies a signal representing the result of detection to a bus control circuit 26, which consists of a microprocessor and so forth. The microprocessor may be the INTEL 8086. The bus control circuit 26 is connected to the host computer 20, and it supplies the signal from the receiving circuit 22 to the host computer 20 and also supplies the output signal from the computer 20 to a transmitting circuit 28. The output signal of the transmitting circuit 28 is supplied to the transceiver 16 and also to the collision detector 24. The collision detector 24 detects a state of collision, in which a signal, transmitted from a host computer other than the associated host computer, is present on the bus line 14 as well as a signal transmitted from the associated host computer, and supplies the result of detection to the bus control circuit 26. The detection of the collision state is effected by an exclusive-OR operation on the transmitted signal and received signal.

Now, the operation of the above embodiment will be described. To make the differences between the present invention and the prior art systems clear, signals on the bus line 14 in the original Ethernet system, the Acknowledging Ethernet system and the present invention are shown in FIGS. 3 to 5. In each of these Figures, the lines represent respective points on the bus line to which three different controllers A, B and C are connected. The controllers A, B and C are shown spaced apart at uniform intervals. The horizontal axis is taken as time. In each of these Figures, it is assumed that a text frame is transmitted from the controller A to the controller C and an acknowledgement frame is sent back from the controller C to the controller A. In the original Ethernet system shown in FIG. 3, the controller A sends out a text frame, which includes a destination address data, in this case, the address of C, to the bus line 14 when the bus line 14 has been detected to be silent for a predetermined period of time. The individual controllers 18 in the local network, are in a stand-by mode unless they are transmitting a frame. Each controller 18 can accept only frames that include the same destination address as its own. In this case, the controller C receives the text frame. When the controller C completes the reception of the text frame, it executes an error check. If no error is detected, it sends an acknowledgement frame back to the controller A. The process of error check takes a certain amount of time. That is, a certain period of time is involved from the instant when the reception of the text frame is completed till the instant when the transmission of the acknowledgement frame is started. In other words, during this period the bus line is silent and is ready for any other controller to transmit a text frame. It may happen that another controller, for instance controller B, transmits another text frame during this time. Therefore, the controllers C and B may simultaneously transmit the acknowledgement frame and text frame respectively. In this case, the controllers B and C detect a collision and stop the transmission after the detection of the collision. The controllers B and C start the transmission afresh after randomly determined periods of time t1 and t2. If the period t2 is shorter, the controller C starts the transmission of the acknowledgement frame to the controller A after the lapse of the period t2. At this time, the controller B cannot start the transmission of the text frame for the silence state of the bus line 14 is not detected. When the period t2 is shorter than the period t1, priority is given to the transmission of the acknowledgement frame, and there is no problem. If the period t1 is shorter than the period t2, however, priority is given to the transmission of the text frame from the other controller reducing the response time. This drawback cannot be avoided because the periods t1 and t2 are randomly determined.

In the Acknowledging Ethernet system shown in FIG. 4, the acknowledgement frame and text frame are dealt with in a different way to avoid collision of acknowledgement frame and text frame. In this system the acknowledgement frame can be transmitted if there is a time period t3 after the silence state of the bus line 14 is detected. The text frame can be transmitted if there is a time period t4 after the silence detection. The period t3 is shorter than the period t4.

In the embodiment of the present invention as shown in FIG. 5, the controller A sends out a first dummy frame immediately after the transmission of the text frame has been completed. The controller C transmits a second dummy frame when it completes the reception of the text frame. When the controller A detects a collision with the second dummy frame, it stops the transmission of the first dummy frame. On the other hand, the controller C does not stop the transmission of the second dummy frame when the collision is detected but continually transmits the second dummy frame. After the controller A stops the transmission of the first dummy frame in response to the detection of the collision, the controller C becomes unable to detect any collision. At this time, the controller A has already stopped the transmission of the first dummy frame and is ready to receive the acknowledgement frame. The controller C thus transmits the acknowledgement frame instead of the second dummy frame to the controller A in response to the discontinuance of the collision detection. In case the error check, i.e., preparation of the acknowledgement frame, has not been completed when the collision detection is over, the controller C continually transmits the second dummy frame until the preparation of the acknowledgement frame is completed. In this embodiment the bus line is occupied by the first and second dummy frames from the completion of text frame transmission till the beginning of acknowlegement frame transmission so that no other text frame can be transmitted during this period. This period is the minimum necessary period so that it will not reduce the transfer efficiency of the network. A propagation delay is involved in the local network where the frame is transmitted through the bus line. It is possible that a controller which has no bearing upon the transmission and reception of the text frame detects the silence state and transmits another text frame during the period from the completion of the text frame transmission till the start of the second dummy frame transmission. This possibility is eliminated by occupying the bus line with the dummy frames during this period. The dummy frame 15 is a predetermined pattern of "0" and "1". Bus control circuit 26 supplies a series of "0" and "1" of predetermined sequence in accordance with the control program to transmitting circuit 28.

Figure 6A:
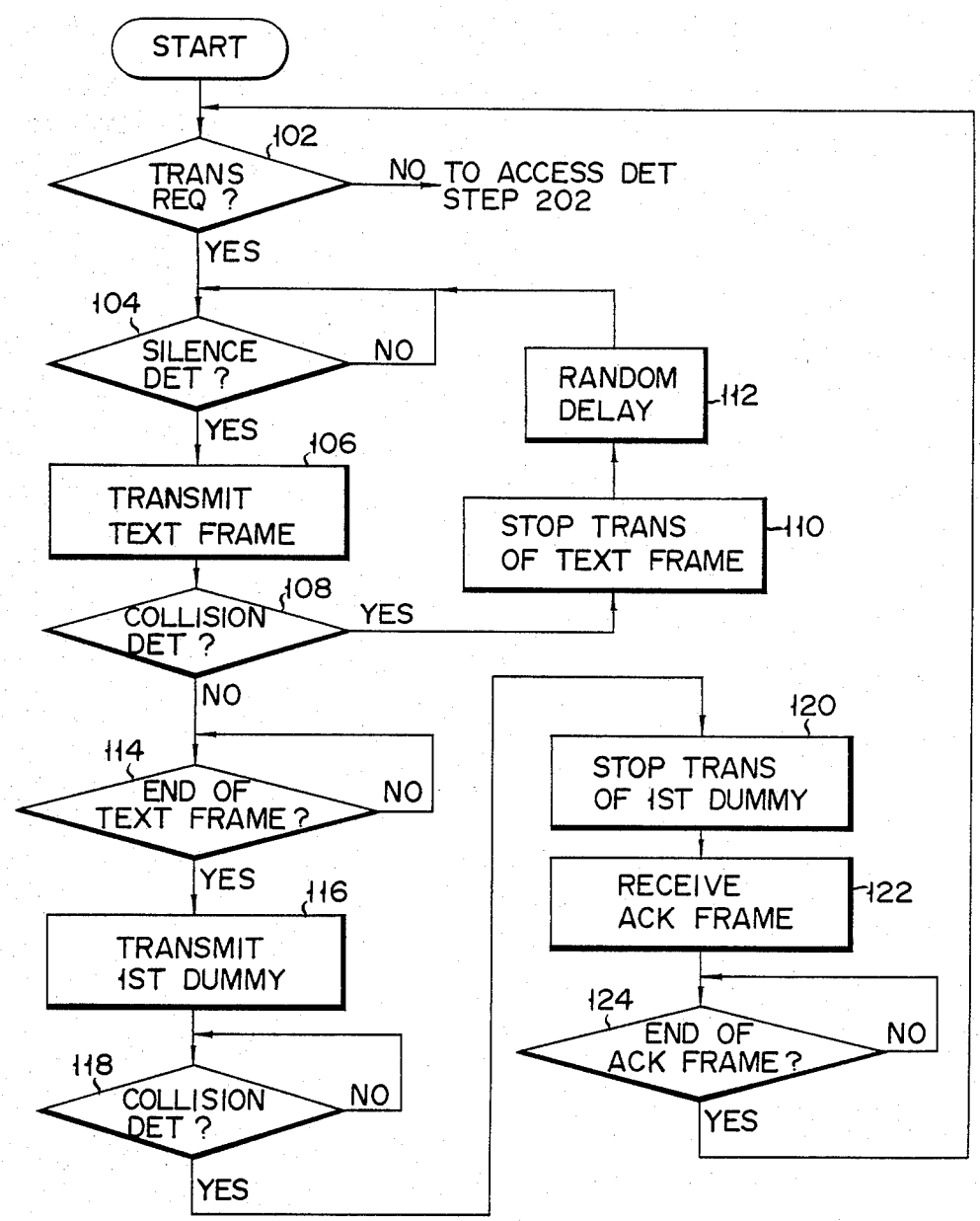
FIGS. 6A and 6B are flow charts for explaining the operation of the embodiment.
Figure 6B:
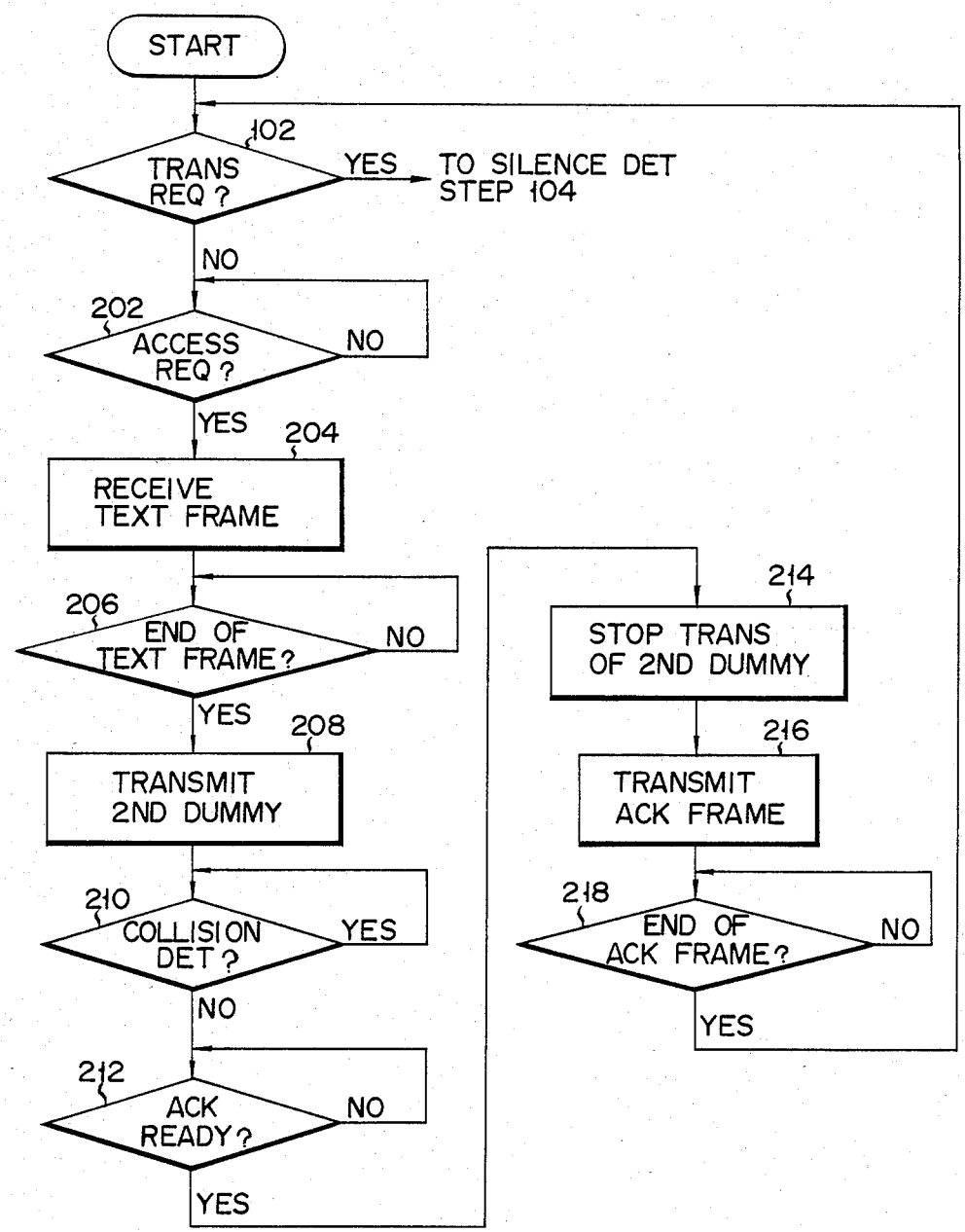

The operation of the bus control circuit 26 in each controller 18, will now be described with reference to the flow charts shown in FIGS. 6A and 6B. FIG. 6A illustrates the operation of the circuit when the host computer connected to the relevant controller is in a transmitting mode. FIG. 6B illustrates the operation when the host computer is in a stand-by mode. Each bus control circuit 26 checks if there is a request of transmission from the host computer in a step 102. If there is a request of transmission, the circuit is set in a transmission mode. If there is no request for transmission, the circuit is set in a stand-by mode. The transmission mode will now be described with reference to FIGS. 6A. When this mode is set, whether there is no frame on the bus line, i.e., whether the bus line is silent, is checked in a step 104. It is determined that the bus line is silent by taking into considerations the propagation delay of the bus line. That is, the bus line is determined to be silent if no frame on the bus line has been detected for a predetermined period of time. If the silence state of the bus line is not detected, the step 104 is repeated until the silence state is detected. When the silence state is detected, the transmission of a text frame, which includes transmission data from the host computer, destination address data, error check signal, etc., is started in a step 106. As soon as the transmission of the text frame to the bus line through the transmitting circuit 28 is started, the bus control circuit 26 begins collision detection in a step 108. If a collision detection signal is supplied from the collision detector 24 to the bus control circuit 26, the transmission of the text frame is stopped in a step 110. A randomly determined delay time is then provided in a step 112, and after this delay time the silence state detection step 104 is executed again. In this way, an error due to a collision can be prevented. Unless a collision is detected, the transmission of the text frame is continued. In a step 114 whether the text frame has been completely transmitted is checked. As soon as a flag representing the end of the text frame is detected, the transmission of the first dummy frame is started in a step 116. The transmission of this frame is continued until a collision is detected.

Any controller other than the controller connected to the transmission side host computer is in the standby mode so long as there is no request for transmission from the associated host computer. In this mode, whether there is a transmitted text frame having the same destination address as its own address is checked in a step 202. If a controller is accessed by the transmitted text frame, the reception of the transmitted text frame is started in a step 204. As soon as it is detected in a step 206 that the flag representing the end of the text frame has been received, the transmission of the second dummy frame is started in a step 208. When the transmission of the second dummy frame is started, the first dummy frame is already on the bus line. Thus, a collision is detected without fail. Even if this collision is detected in a step 210, the bus control circuit 26 on the receiving side does not stop the transmission of the second dummy frame. On the transmission side, as soon as the collision is detected in a step 118, in FIG. 6A, the transmission of the first dummy frame is stopped in a step 120. Thus, on the receiving side the collision is continually detected until the propagation delay time of the bus line has elapsed from the instant of stoppage of transmission of the first dummy frame. When the collision is no longer detected in the step 210, in FIG. 6B, whether the acknowledgement frame has been prepared, i.e., whether an error check has been completed is judged in a step 212. If the acknowledgement frame is ready, the transmission of the second dummy frame is stopped in a step 214, and the transmission of the acknowledgement frame is immediately started in a step 216. The acknowledgement frame is received by the transmitting side controller in a step 122, in FIG. 6A. As soon as the end of the acknowledgement frame is detected in a step 124, the bus control circuit 26 is brought again to the state in which the mode detecting step 102 is executed. In the receiving side controller, the circuit 26 is also brought to the mode detecting step 102 as soon as the end of the acknowledgement frame is detected in a step 218. Normally, each controller is thus executing the mode detecting step 102.

As has been described in the foregoing, according to the invention a controller connected to the transmitting side host computer transmits the first dummy frame immediately after the completion of the text frame transmission while a controller connected to the receiving side host computer transmits the second dummy frame from the instant of the completion of the text frame reception until it is ready to transmit the acknowledgement frame. Since the bus line is occupied by the first and second dummy frames, the most significant priority can be given to the transmission of the acknowledgement frame after the transmission of the text frame. Thus, it is possible to realize a communication system for a local network which has a high response time, and hence a high transfer rate.

The embodiment of the invention described above is by no means limitative, and various changes and modifications can be made on the details of the hardware. For example, the controllers may be dispensed with, and their functions may be provided on the host side. Also, the transceivers may be connected to the bus line in various other suitable ways than the method described above.

What is claimed is:

1. A communication system for a local network interconnecting a plurality of computer units comprising:
   a common bus line; and
   controllers, each connected between a respective computer unit and said common bus, for controlling access to the bus line, each controller including a collision detector for detecting a frame collision on the bus line, each controller including means for transmitting, when a request for transmission is supplied and a collision is not detected, a text frame and a first dummy frame immediately following said text frame, said first dummy frame being transmitted until a collision is detected, each of said controllers including means for transmitting, when a text frame is received, a second dummy frame from a time of completion of the text frame reception till a later one of the times when a collision state is no longer detected and when it is ready to transmit an acknowledgement frame and said acknowledgement frame is transmitted immediately after said second dummy frame.

2. A communication system according to claim 1, in which each of said controllers includes means, upon receiving a request for transmission from its associated computer unit, for checking whether there is a frame on said common bus line and transmitting a text frame including a destination address data, a text content and an error check signal to said common bus line if a silence state without any frame on the bus line has been detected for a predetermined period of time and, means for when receiving no request for transmission, receiving a text frame containing the same destination address data as the data as the own address, executing an error check and transmitting an acknowledgement frame after completing the error check.

3. A communication system according to claim 1, in which each of said controllers includes means for checking while transmitting a text frame, whether there is a collision with a frame from a different controller on said bus line and, when a collision is detected, stopping the text frame transmission and checking whether the line is silent after a predetermined period of time from the collision detection.

4. A communication system according to claim 1, in which the collision detecting means comprises an exclusive-OR signal obtained from a transmitted frame signal and a received frame signal.

5. A communication system according to claim 1, wherein said first and second dummy frames each consist of alternate logic "1" and "0" signals.

6. A local system for interconnecting a plurality of computer units comprising:

a common bus line terminated at each of its ends;

a plurality of transceivers connected to said common bus line through respective bilateral taps; and controllers, each connected between a respective transceiver and a corresponding computer unit, each controller including a detector for detecting a collision on said common bus line, a receiving circuit for detecting a silence state with no frame on said common bus line for a predetermined period of time and a bus control circuit for controlling the transmission from and reception by said corresponding computer unit, said bus control circuit including means for transmitting, when a request for transmission is supplied from its corresponding computer unit, a text frame when a silence state signal is supplied from said receiving circuit and a first dummy frame from the instant of completion of the text frame transmission until a collision is detected, said bus control circuit including means for transmitting, when no request for transmission is supplied, a second dummy frame from an instant of completion of reception of a text frame till a later one of the times when the collision is no longer detected and when it is ready to transmit an acknowledgement frame and said acknowledgement frame is transmitted immediately after said second dummy frame.

7. A local network system according to claim 6, in which each of said bus control circuits includes means for stopping the transmission of a text frame when a collision is detected after the start of the text frame transmission and detecting whether said common bus line is silent after a predetermined period of time from the collision detection.

8. A local network system according to claim 6, in which said collision detector in said bus control circuit includes an exclusive-OR gate receiving transmitted frame and received frame signals.

9. A local network system according to claim 6, wherein the text frame transmitted from said bus control circuit includes a destination address data, a text content and an error check signal, and the bus control circuit without receiving any request for transmission, receives a text frame including the same destination address data as its own address and, after completing an error check, transmits an acknowledgement frame.

10. A local network system according to claim 6, wherein said common bus line consists of a coaxial cable.

11. A local network system according to claim 6, in which said controller transmits as said first and second dummy frames a signal consisting of alternate logic "1" and "0" levels.

* * * * *